US010639965B2

(12) United States Patent
Quetant et al.

(10) Patent No.: US 10,639,965 B2
(45) Date of Patent: May 5, 2020

(54) AUTOMATIC CONTROL METHOD USED FOR DEFROSTING A HEAT PUMP FOR A VEHICLE

(71) Applicant: RENAULT s.a.s., Boulogne Billancourt (FR)

(72) Inventors: Eudes Quetant, Guyancourt (FR); Virginie Goutal, La Celle les Bordes (FR); Myriam Pasquini, Paris (FR)

(73) Assignee: RENAULT s.a.s., Boulogne Billancourt (FR)

( * ) Notice: Subject to any disclaimer, the term of this patent is extended or adjusted under 35 U.S.C. 154(b) by 86 days.

(21) Appl. No.: 16/107,852

(22) Filed: Aug. 21, 2018

(65) Prior Publication Data

US 2019/0023104 A1  Jan. 24, 2019

Related U.S. Application Data

(63) Continuation of application No. 14/383,657, filed on Sep. 8, 2014, now abandoned.

(30) Foreign Application Priority Data

Mar. 8, 2012  (FR) ...................................... 12 52112

(51) Int. Cl.
*B60H 1/32* (2006.01)
*F25B 47/02* (2006.01)
*B60H 1/00* (2006.01)

(52) U.S. Cl.
CPC ....... *B60H 1/3213* (2013.01); *B60H 1/00921* (2013.01); *B60H 1/321* (2013.01); *F25B 47/025* (2013.01)

(58) Field of Classification Search
CPC .. B60H 1/3213; B60H 1/00921; B60H 1/321; F25B 47/025
USPC .......................................................... 62/81
See application file for complete search history.

(56) References Cited

U.S. PATENT DOCUMENTS 2,554,848 A * 5/1951 Warren ................. F25B 47/022
                                              62/81
3,636,723 A * 1/1972 Kramer ................ F25B 43/006
                                             62/197
3,792,594 A * 2/1974 Kramer ................ F25B 43/006
                                             62/503

(Continued)

FOREIGN PATENT DOCUMENTS

FR        2958019         9/2011

OTHER PUBLICATIONS

International Search Report dated Dec. 21, 2012 in PCT/EP12/073558, filed Nov. 26, 2012.

*Primary Examiner* — Len Tran
*Assistant Examiner* — Kristin U Oswald
(74) *Attorney, Agent, or Firm* — Oblon, McClelland, Maier & Neustadt, L.L.P.

(57) ABSTRACT

A control method for a heat pump system, or for a motor vehicle, which includes a compressor, an internal heat exchanger forming a condenser in a heating mode, an expansion valve, an outer heat exchanger forming an evaporator in the heating mode, and an accumulator. The defrosting of the outer exchanger is detected, the defrosting of the accumulator is detected, and depending on the case, defrosting the outer exchanger and/or defrosting the accumulator is started.

17 Claims, 8 Drawing Sheets

(56) References Cited

U.S. PATENT DOCUMENTS

| | | | | |
|---|---|---|---|---|
| 3,922,875 | A | * | 12/1975 | Morris, Jr. .............. F25B 40/00 62/156 |
| 4,279,129 | A | * | 7/1981 | Cann ...................... F25B 13/00 62/278 |
| 4,286,435 | A | * | 9/1981 | Cann ...................... F25B 13/00 62/196.1 |
| 4,680,940 | A | * | 7/1987 | Vaughn ................. F25D 21/006 62/155 |
| 5,971,845 | A | * | 10/1999 | Echigoya ........... B60H 1/00735 454/121 |
| 2004/0134207 | A1 | * | 7/2004 | Morita .............. B60H 1/00792 62/158 |
| 2005/0103029 | A1 | * | 5/2005 | Kawahara .............. F25D 29/008 62/126 |
| 2006/0254308 | A1 | * | 11/2006 | Yokoyama ........... B60H 1/3205 62/500 |

* cited by examiner

AUTOMATIC CONTROL METHOD USED FOR DEFROSTING A HEAT PUMP FOR A VEHICLE

CROSS-REFERENCE TO RELATED APPLICATIONS

This application is a continuation of U.S. application Ser. No. 14/383,657, filed Sep. 8, 2014, which is in turn a national stage application of International Application No. PCT/EP12/073558, filed Nov. 26, 2012, and which claims the benefit of priority from French Application No. 1252112, filed on Mar. 8, 2012, the entire contents of each of which are incorporated herein by reference.

TECHNICAL FIELD

The present invention relates to the field of heat pump systems fitted to some types of motor vehicles, notably electric or hybrid vehicles. More specifically, it relates to a control method for the heat pump system of these vehicles, said method being used to defrost some components of said system when the external air temperature is low.

PRIOR ART

There is a known way of using a heat pump in vehicles for heating and/or air conditioning the passenger compartment of the vehicle. This heat pump is reversible so that it can operate in both heating mode and air conditioning mode. It conventionally comprises a compressor for heating and compressing a refrigerant fluid, an internal heat exchanger forming a condenser in heating mode for heating the internal air in the passenger compartment of the vehicle by heat exchange with the refrigerant fluid flowing from the compressor, an expansion valve for cooling the refrigerant fluid flowing from the internal heat exchanger, and finally an external heat exchanger forming an evaporator in heating mode for heating the refrigerant liquid flowing from the expansion valve by heat exchange with external air. The heat pump also conventionally comprises an accumulator interposed between the external heat exchanger and the compressor, notably for storing the refrigerant fluid before compression by the compressor, and also for providing an oil return flow toward the compressor.

In heating mode, if the external temperature is close to 0° C. or is negative, and if the air is relatively humid, frost may form on the outer walls of the external heat exchanger. The amount of frost formed is a function of several parameters, notably the humidity level of the external air and the temperature difference between the refrigerant fluid flowing in the exchanger and the external air. This frosting of the external exchanger then leads to a decrease in the efficiency of the heat pump, which increases the electricity consumption for the same performance level, or reduces the performance for the same level of electricity consumption. This also reduces the maximum power of the system.

In order to remove this frost, there is a known way of placing an electrical resistance near the exchanger for heating the external air entering the exchanger in order to defrost the outer walls of the latter. This solution is not satisfactory, because it increases the total electricity consumption of the system, which has negative effects in the case of electric or hybrid vehicles.

Another known solution, described in the patent document JP-A-1 0-166846, consists in supplying the external heat exchanger directly with of the refrigerant fluid compressed by the compressor. The expansion valve and the internal heat exchanger are no longer present in the refrigerant fluid flow circuit. The external heat exchanger then has refrigerant fluid heated by the compressor flowing through it. The external heat exchanger then operates as a condenser so as to cause the melting of at least some of the frost present on its walls.

All these solutions have been designed to allow complete defrosting of the external heat exchanger. However, other parts of the heat pump become frosted, notably the low pressure pipes and the accumulator, which is detrimental to the performance of the heat pump and which, because of the successive accumulation of frost on the walls of these elements and the proximity of other elements in the immediate environment, risks causing noise and may result in consequential damage. In heating mode, the accumulator is one of the coldest points of the heat pump, because located in the low pressure and intake area of the compressor. The same applies to the pipes and hoses connecting the outlet of the external exchanger to the inlet of the compressor. Therefore, frost forms on the walls of these elements as well, when the external temperature is low. Furthermore, during the defrosting of the external exchanger, the temperature of the fluid supplied to the accumulator has already fallen considerably because said fluid has already released much of its heat in the external exchanger to cause the melting of the frost present on the walls of the latter. Consequently, the complete defrosting of the external exchanger does not necessarily result in the complete defrosting of the accumulator, especially if the defrosting of the exchanger has been optimized in terms of time and power (by means of the motor speed of the compressor) to reduce the electricity consumption of the system as far as possible. This presence of frost on the accumulator has the disadvantage that it not only lowers the performance of the heat pump by keeping the fluid contained in the accumulator at a low temperature, but also increases the proximity of the exchanger to other parts of the vehicle, thus increasing the risk of impact with these other parts, increasing the risk of noise due to these impacts, and increasing the risk of degradation of the accumulator and of these parts.

Description of the Invention

One object of the invention is to overcome all or some of the aforesaid drawbacks of the prior art.

Another object of the invention is to carry out more complete defrosting of the heat pump while having the least possible effect on the other operating modes of the heat pump system.

Another object of the invention is to have the least possible effect on the electricity consumption of the system.

According to the invention, it is proposed that defrosting be carried out not only on the external exchanger, but also on the accumulator if frosting of the latter is detected.

The invention proposes a control method for a heat pump system, notably for a motor vehicle, said system comprising a compressor for heating and compressing a refrigerant fluid, an internal heat exchanger forming a condenser in heating mode for heating internal air by exchange with the refrigerant fluid flowing from the compressor, an expansion valve for cooling the refrigerant fluid and an external heat exchanger forming an evaporator in heating mode for heating the refrigerant liquid flowing from the expansion valve by exchange with external air, an accumulator also being interposed between the external heat exchanger and the compressor for storing the refrigerant fluid before compression, the method being characterized in that it comprises the following steps:

a) in heating mode, detecting the frosting of the external heat exchanger, b) determining a data element representing the duration of the frosting of the heat exchanger, c) if the duration of the frosting of the external heat exchanger is greater than or equal to a first predetermined maximum duration, sending a command for defrosting the exchanger, and d) if a command for defrosting the exchanger is sent, starting an operation of defrosting the external heat exchanger and, according to a predefined principle, starting an operation of defrosting the accumulator by circulating a fluid compressed by the compressor in said external exchanger and said accumulator.

Thus, according to the invention, the frosting of the external exchanger is detected, and an operation of defrosting the external heat exchanger and/or an operation of defrosting the accumulator is then started according to a predefined principle.

In a specific embodiment, the predefined principle is that an operation of defrosting the accumulator is started on one of every n occasions, where n is an integer greater than or equal to 2, if a command for defrosting the exchanger is sent, and that an operation of defrosting the external heat exchanger is started on the other occasions.

This is because complete defrosting of the external exchanger optimized in terms of time and power consumption does not permit complete defrosting of the accumulator. In fact, the thickness of the frost on the latter may increase, depending on the external conditions and the driving conditions. At a certain point, it becomes necessary to defrost it, because the associated thickness increases its proximity to other parts of the vehicle (with risk of noise and damage) and decreases its performance. It is therefore useful to ascertain the frosting associated with these two elements in order to carry out the appropriate defrosting operation.

In another embodiment, step a) of the method further includes a step of detecting the frosting of the accumulator, step b) further comprises a step of determining a data element representing the duration of the frosting of the accumulator, and step c) further comprises the sending of a command for defrosting the accumulator if the duration of the frosting of the external heat accumulator is greater than or equal to a second predetermined maximum duration. In this case, the predefined principle is that an operation of defrosting the accumulator is started if a command for defrosting the accumulator is sent, and that an operation of defrosting the external heat exchanger is started if a command for defrosting the exchanger is sent.

Thus the appropriate defrosting operation is started, in order to use energy and defrosting time only when this is necessary.

In a specific embodiment, the operation of defrosting the external exchanger or the accumulator comprises a step of putting the compressor into operation at a first predetermined motor speed, in order to cause hot refrigerant fluid to flow in the external heat exchanger and the accumulator for a duration which is less than or equal to a third predetermined maximum duration C3, said motor speed and said third maximum duration being a function of said defrosting operation. The flow of this hot refrigerant fluid makes it possible to melt the frost present on the outer walls of the external exchanger and, if necessary, the frost present on the outer walls of the accumulator.

In a specific embodiment, the system further comprises a motorized fan unit near the external heat exchanger, and the operation of defrosting the external exchanger or the accumulator further comprises, if the external air temperature is above a first predetermined temperature value, a step of putting the motorized fan unit into operation for a duration less than or equal to a fourth maximum duration in order to produce an air flow used to remove the water remaining on the outer walls of said external heat exchanger after the melting of the frost. During this step, the compressor remains in operation.

In a specific embodiment, frosting of the external heat exchanger is detected if the external air temperature is below a second predetermined temperature value while, at the same time, the temperature difference between the external air temperature and the temperature of the refrigerant fluid at the outlet of the external heat exchanger is above a third predetermined temperature value. Said third temperature value is advantageously a function of the external air temperature.

In a specific embodiment, the frosting of the accumulator is detected if the motor speed of the compressor is above a second predetermined value of motor speed while, at the same time, the external air temperature is below a fourth predetermined temperature value, and the temperature difference between the external air temperature and the temperature of the refrigerant fluid at the outlet of the external heat exchanger is above a fifth predetermined temperature value. Said fifth temperature value is advantageously a function of the external air temperature.

The predetermined temperature values may differ according to the type and mission profile of the heat pump system.

In a specific embodiment, during step b), a first counter is incremented when the frosting of the external heat exchanger is detected, and a second counter is incremented when the frosting of the accumulator is detected. The count value of these two counters can be used to determine the duration of the frosting of the exchanger and the accumulator.

Advantageously, said first and second counters are reset to zero when the temperature of the external air is higher than or equal to a sixth predetermined positive temperature value. Thus, if for example the vehicle is parked for a certain time at a slightly positive external temperature, this external air will naturally exchange heat with the frost and cause it to melt. In this case, it may be considered that a defrosting operation is no longer necessary. The counters are therefore reset to zero.

On the other hand, during step c), a command for defrosting the external exchanger is sent if the count value of the first counter is greater than or equal to a first count value representing said first maximum duration, and a command for defrosting the accumulator is sent if the count value of the second counter is greater than or equal to a second count value representing said second maximum duration.

Advantageously, an operation of defrosting the external exchanger or the accumulator is started only if the speed of the vehicle is less than or equal to a predetermined speed of 30 km/h or below. This is because it may be considered that there is no point in starting a defrosting operation above this value, since even if the external exchanger or the accumulator has hot fluid flowing through it, the cold air flowing through the external exchanger will keep the frost present.

Advantageously, the defrosting operation is stopped on the occurrence of another demand from the system circuit, this demand being different from defrosting, and taking priority over the latter. This demand may be, for example, a demand for heating or air conditioning for comfort in the passenger compartment.

The defrosting operation is performed even if the speed of the vehicle is above said predetermined value of speed. In this case, the system comprises a controlled flap valve to prevent dynamic air from flowing through the external exchanger during the defrosting operation.

In a specific embodiment, the step of putting the compressor into operation at a first motor speed for a duration which is less than or equal to a third maximum duration comprises the following steps:

putting the compressor into operation at said first motor speed, and incrementing a third counter, as long as the temperature of the refrigerant fluid at the outlet of the external heat exchanger is less than or equal to a seventh predetermined temperature value and as long as the count value of the third counter is less than a third predetermined count value representing a fifth maximum duration which is less than said third maximum duration, and as long as the external temperature is less than or equal to an eighth predetermined temperature;

stopping said compressor when the incrementing of the third counter is stopped.

In a specific embodiment, the step of putting the motorized fan unit into operation for a duration which is less than or equal to a fourth maximum duration comprises the following steps:

putting the motorized fan unit into operation if the external air temperature is greater than or equal to said first predetermined temperature value, and incrementing a fourth counter, as long as the temperature of the fluid at the outlet of the external heat exchanger is greater than or equal to a ninth predetermined temperature value and as long as the count value of the fourth counter is less than a fourth predetermined count value representing said fourth maximum duration, stopping the motorized fan unit when the incrementing of the fourth counter is stopped.

Advantageously, the compressor is put into operation while the motorized fan unit is being put into operation, to optimize water removal during the blowing phase.

Advantageously, during the incrementing of the fourth counter, the compressor operates at a third motor speed which is less than or equal to said first motor speed. This is because it is simply necessary to cause a refrigerant fluid to flow in the circuit at a temperature which prevents the water produced by the melting of the frost from refreezing, so that it can be removed by blowing.

Advantageously, the incrementation interval, or the incrementation speed, of the first and/or second counters is a function of the external temperature, so that a better evaluation can be made of the amount and intensity of frost present on the external exchanger and/or on the accumulator.

Advantageously, the incrementation interval, or the incrementation speed, of the first and/or second counters is also a function of the temperature difference between the external air temperature and the temperature of the refrigerant fluid at the outlet of the external heat exchanger, so that a better evaluation can be made of the amount and intensity of frost present on the external exchanger and/or on the accumulator.

In another embodiment, provision is also made for controlling an operation of defrosting the external exchanger or the accumulator by means of a user command, for example when the user wishes to ensure that the heat pump is defrosted.

Advantageously, the state of the counters is read by an external diagnostic tool in order to verify the state of frosting of the components of the heat pump.

Other advantages may also be apparent to a person skilled in the art from reading the examples below, illustrated by the appended figures, provided for illustrative purposes.

DETAILED DESCRIPTION OF AT LEAST ONE EMBODIMENT

Figure 1:
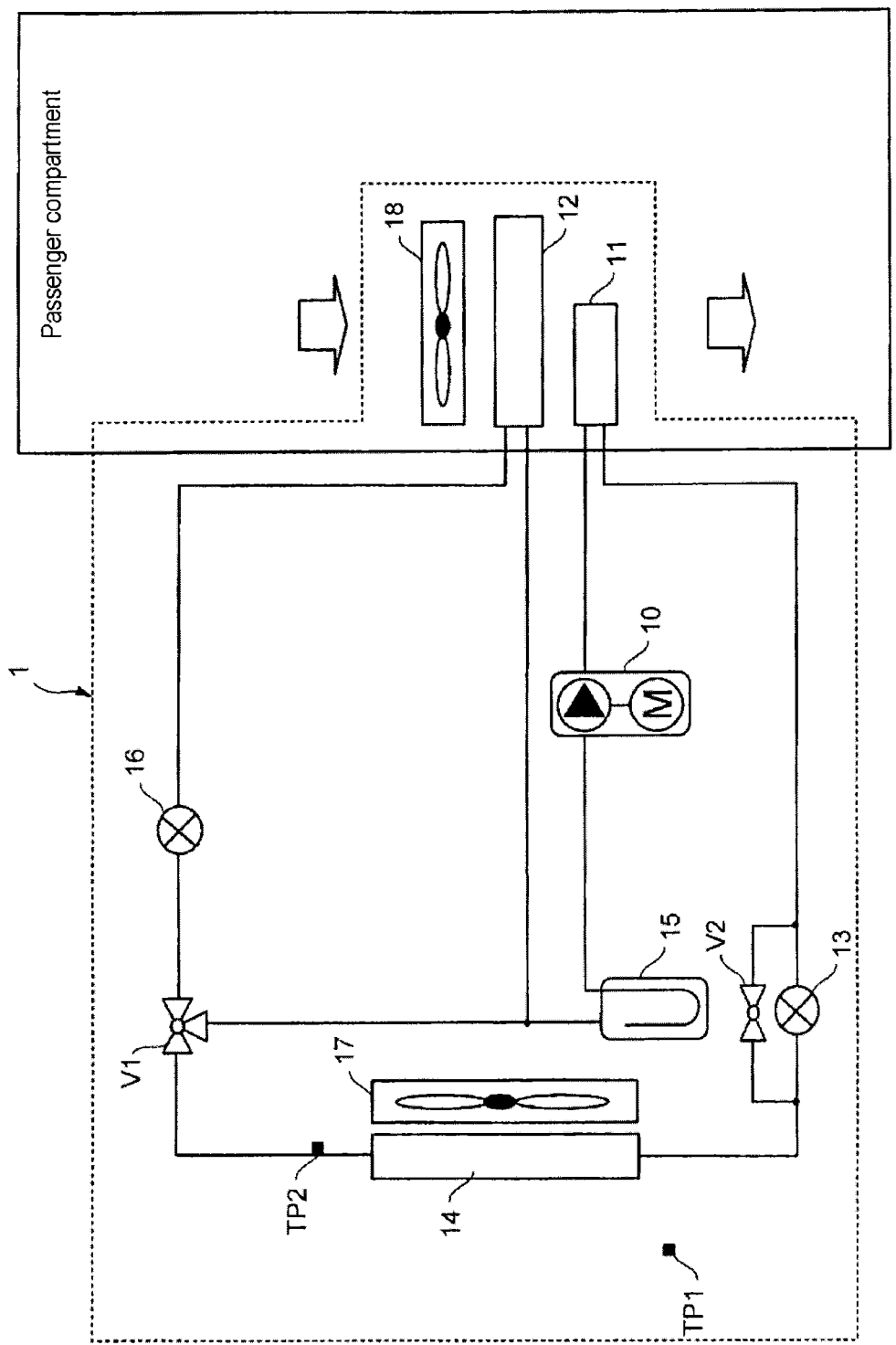
FIG. 1 is a block diagram of a heating/air conditioning system for which the method of the invention can be used.
Figure 2:
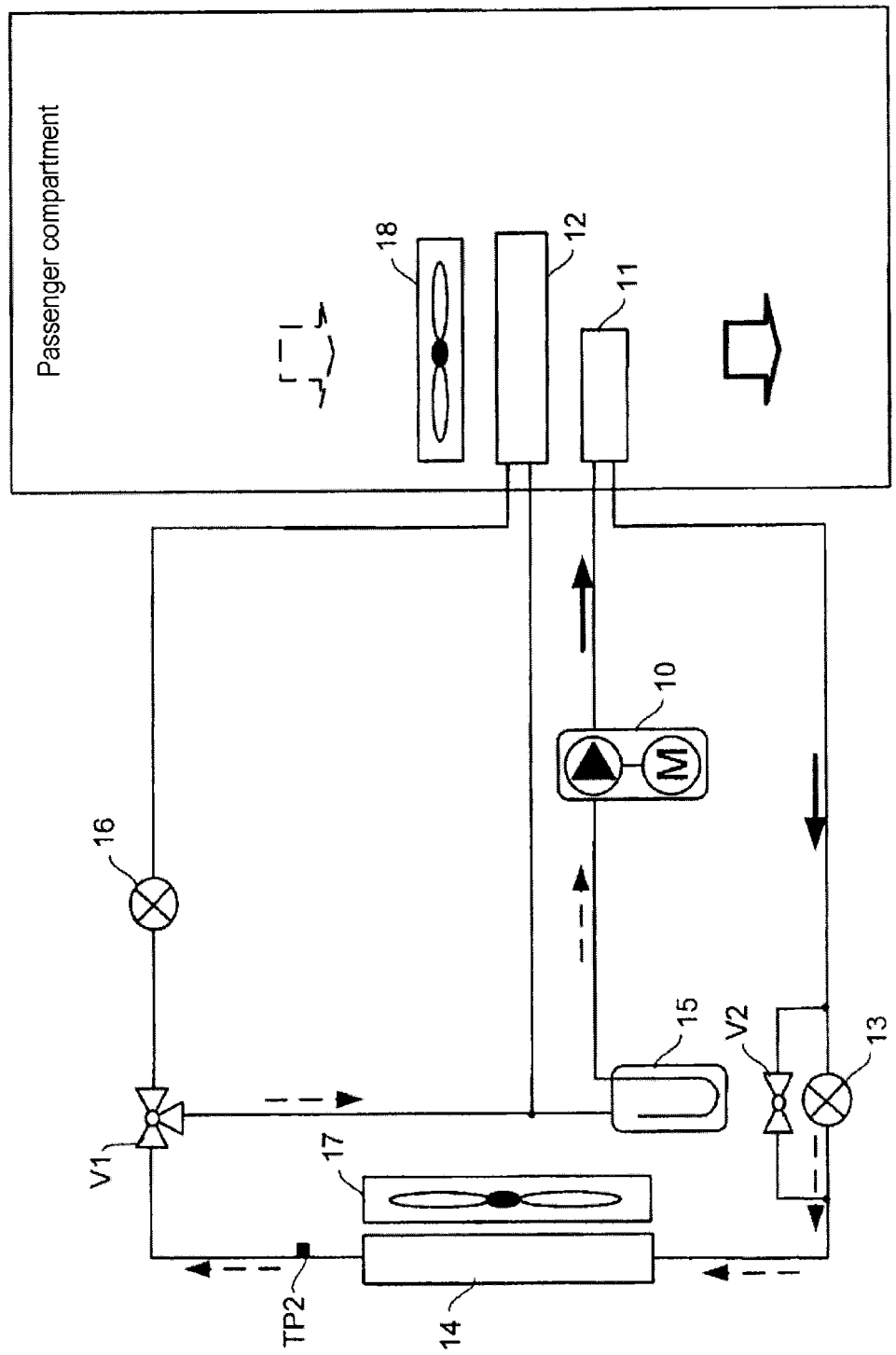
FIG. 2 is a diagram illustrating the operation of the system of FIG. 1 in heating mode.
Figure 3:
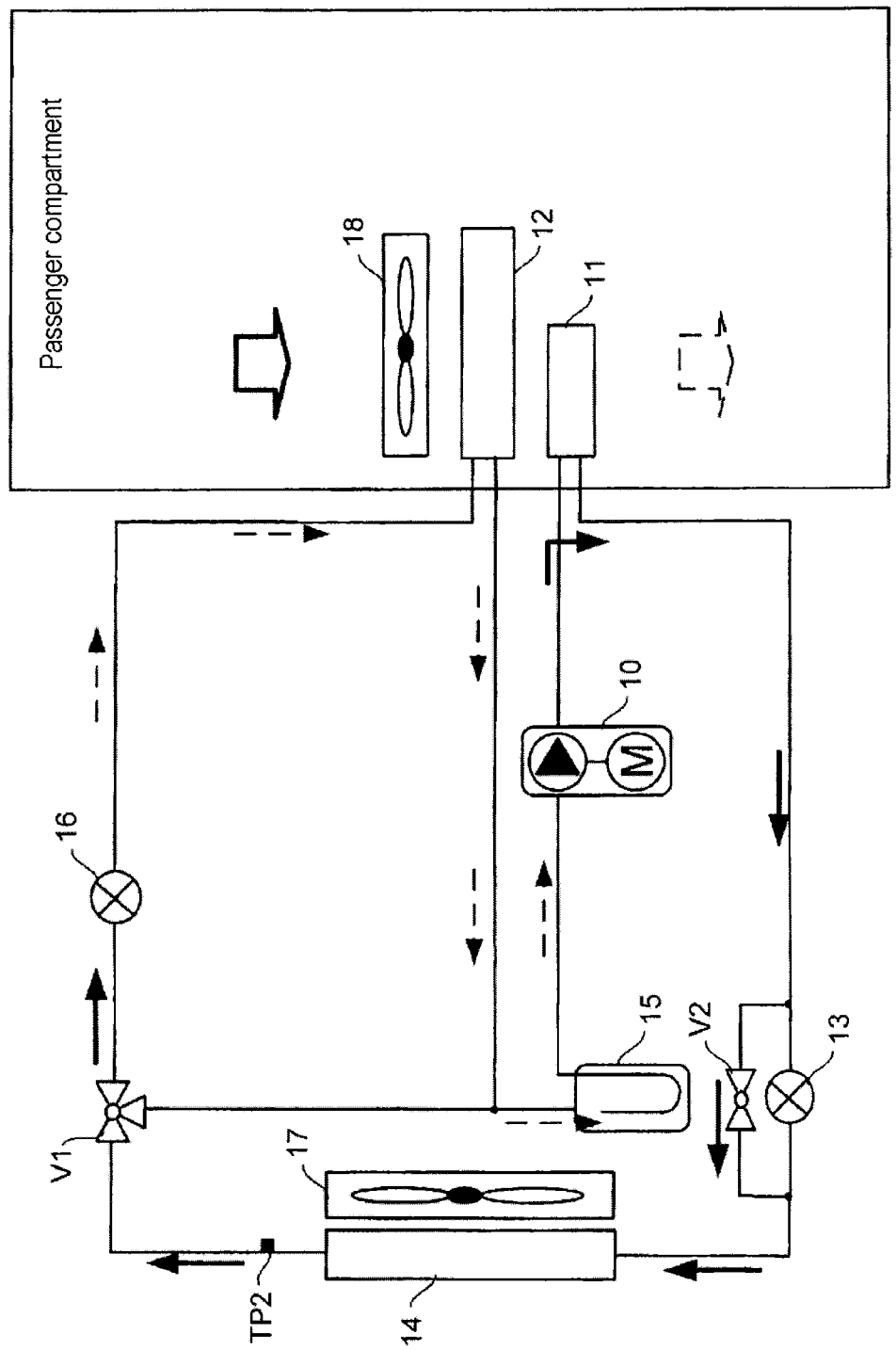
FIG. 3 is a diagram illustrating the operation of the system of FIG. 1 in air conditioning mode.
Figure 4:
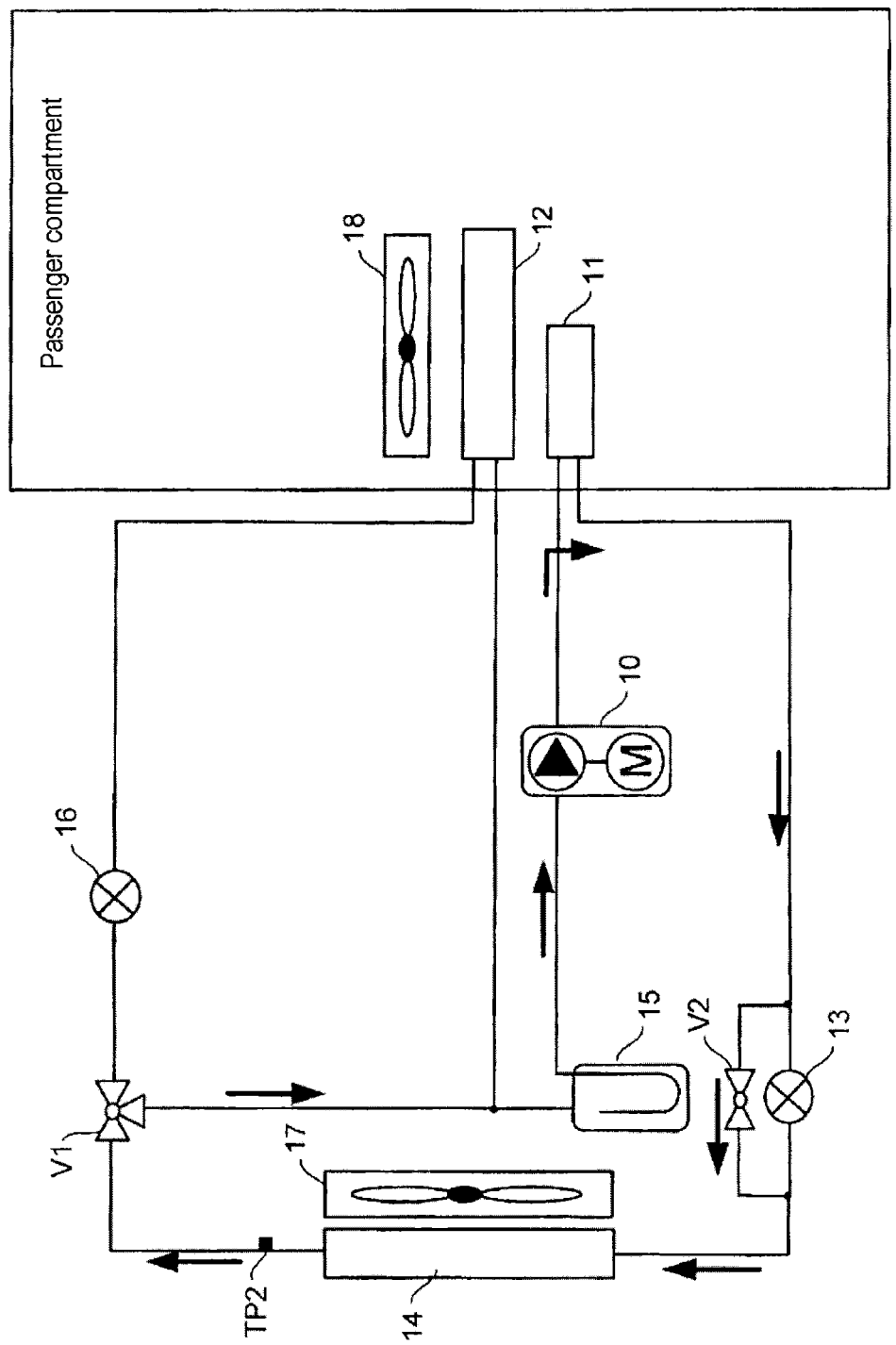
FIG. 4 is a diagram illustrating the operation of the system of FIG. 1 in defrosting mode.

FIG. 1 shows a heat pump system 1 for which the method of the invention can be used. This system includes a compressor 10, an internal heat exchanger 11 forming an internal condenser in heating mode, another internal heat exchanger 12 forming an internal evaporator in air conditioning mode, an expansion valve 13 for the heating mode, an external heat exchanger 14 forming an evaporator in heating mode, an expansion valve 16 for the air conditioning mode, and an accumulator 15. These various components have a refrigerant fluid flowing through them. Valves V1 and V2 are also provided to modify the path of a refrigerant fluid through these various components according to one of the following operating modes of the system:

in heating mode, the system heats the internal air of the passenger compartment of the vehicle; this operating mode is shown in FIG. 2;

in air conditioning mode, the system cools the internal air of the passenger compartment of the vehicle; this operating mode is shown in FIG. 3; and in defrosting mode, the system defrosts the outer walls of the external heat exchanger 14 and/or of the accumulator 15; this operating mode is shown in FIG. 4.

The valve V1 is a three-way valve comprising an inlet coupled to the outlet of the external heat exchanger 14, a first outlet coupled to the inlet of the compressor 10 via the accumulator, and a second outlet coupled to an inlet of the expansion valve 16. The valve V2 is a two-way valve for bypassing the expansion valve 13 in defrosting mode and in air conditioning mode.

The system further comprises an external temperature sensor TP1 located in an area outside the passenger compartment of the vehicle, enabling a temperature representing the external temperature to be captured, for example under a rear-view mirror of the vehicle, and a temperature sensor TP2 for measuring the temperature of the refrigerant fluid at the outlet of the exchanger 14. Finally, motorized fan units 17 and 18 are provided to diffuse the air, respectively, through the external exchanger 14 and through the internal exchangers 11 and 12, and to increase the heat exchanges in the various operating modes of the system.

As mentioned above, the refrigerant fluid flow circuit of the system changes according to the operating mode in use.

In heating mode, shown in FIG. 2, the valve V1 is operated so as to couple the outlet of the exchanger 14 to the inlet of the compressor 10 via the accumulator 15. The compressor 10 heats and compresses the refrigerant fluid received from the external heat exchanger 14 which in this case forms an evaporator. Having been compressed in this way, the fluid is then supplied to the exchanger 11 (condenser) which is used to heat the internal air of the passenger compartment by heat exchange with the refrigerant fluid flowing from the compressor. The refrigerant fluid is then cooled and expanded by the expansion valve 13, and is then supplied to the external exchanger 14 again. In this operating mode, the valve V2 is closed, and therefore the refrigerant fluid does not flow through it. Additionally, the motorized fan units 17 and 18 are in operation according to the requirements of the system. For example, when the vehicle is driven at high speed, there is no point in putting the motorized fan unit 17 on the front surface of the vehicle into operation. The movement of the fluid in the system is indicated by the arrows. The arrows in solid lines indicate a movement of fluid at high pressure (compressed fluid) and the arrows in broken lines indicate a movement of fluid at low pressure (expanded fluid).

In air conditioning mode, shown in FIG. 3, the valve V1 is operated so as to couple the outlet of the exchanger 14 to the inlet of the expansion valve 16. This expansion valve is used to expand and cool the refrigerant fluid received from the external heat exchanger 14 which forms a condenser in this operating mode. The expanded refrigerant fluid flows through the evaporator 12 to cool the internal air of the passenger compartment by heat exchange with the refrigerant fluid. The refrigerant fluid then flows through the accumulator 15 and then the compressor 10. This heats and compresses the refrigerant fluid which then flows through the valve V2 and then the external exchanger 14. A valve V3, not shown in the figures, advantageously enables the exchanger 11 to be bypassed to avoid any heat transfer from the refrigerant fluid toward the inside of the passenger compartment via the exchanger 11. In the absence of a valve V3, a mixing flap valve, not shown in the figure, is provided so that the air flow from the evaporator 12 bypasses the exchanger 11, thereby maintaining the air conditioning performance. In this mode, the motorized fan units 17 and 18 are in operation according to the requirements of the system. For example, when the vehicle is driven at high speed, it is unnecessary to put the motorized fan unit 17 on the front surface into operation. At lower speeds, the motorized fan unit 17 must be put into operation to provide effective condensation and to limit the fluid pressure.

In defrosting, shown in FIG. 4, the refrigerant fluid does not flow through any forced expansion element (expansion valve or tube orifice) of the system. The valve V1 is operated so as to couple the outlet of the exchanger 14 to the inlet of the compressor 10 via the accumulator 15. The compressor 10 heats and compresses the refrigerant fluid to a small extent. The compressed fluid then flows through the valve V2 and then the external exchanger 14. The hot fluid flows through the external exchanger 14 and the accumulator 15, enabling the frost present on their outer walls to be gradually melted. In this mode, the motorized fan unit 17 is in operation if necessary at the end of defrosting, as will be described below.

The control of the defrosting of the system will now be described in greater detail. This control is automatic and does not require any action or intervention by the user of the vehicle. It is described with reference to FIGS. 5, 6 and 7. In these figures, $T_{ext}$ denotes the temperature of the external air measured by the temperature sensor TP1, $T_S$ denotes the temperature of the refrigerant fluid at the outlet of the external exchanger 14, measured by the temperature sensor TP2, and $RPM_{Comp}$ denotes the number of rotations per minute of the motor of the compressor 10.

The frost forms on the outer walls of the external exchanger 14 and of the accumulator 15 if the external temperature is negative or close to zero, and if the system is operating in heating mode. The frost detection therefore takes place in the heating mode of the system. After detection, the defrosting operations are performed when the system is no longer in heating mode, and preferably when the vehicle is stationary.

Figure 5:
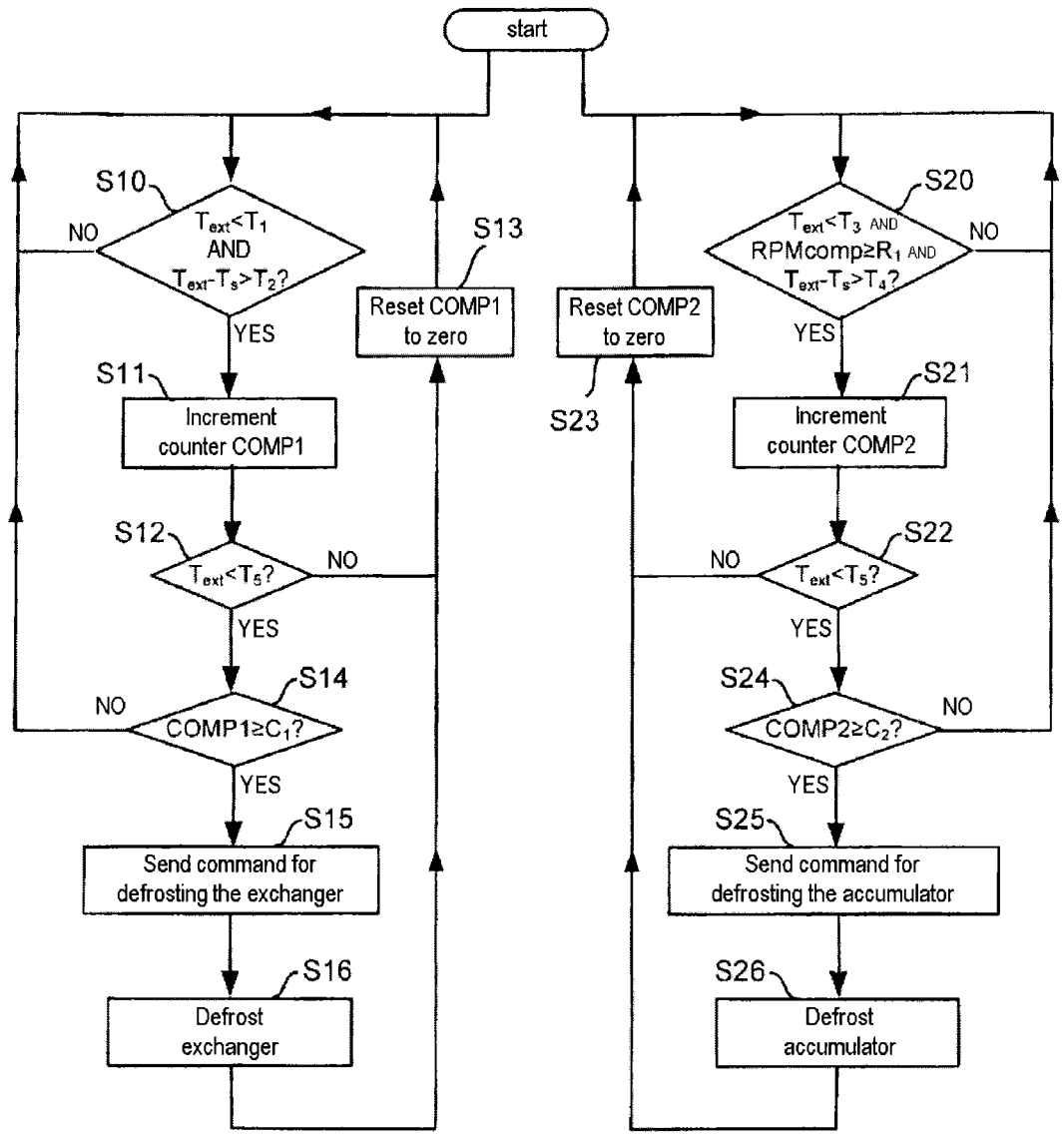
FIG. 5 is a flow diagram showing the main steps of a first embodiment of the method of the invention.

With reference to FIG. 5, the method of the invention comprises a set of steps S10 to S16 for detecting frosting of the external exchanger 14 and defrosting it, and a set of steps S20 to S26 for detecting frosting on the accumulator 15 and defrosting it. These two sets of steps are executed in parallel.

The steps relating to the detection of frosting and to the defrosting of the external exchanger will be described first. The method of the invention includes, initially, a step S10 of detecting frosting of the external exchanger 14. In this step, the external exchanger 14 is detected to be in the frosting condition if:

$T_{ext} < T_1$, and $T_{ext} - T_s > T_2$;

where $T_1$ is a temperature close to 0° C. and $T_2$ is a positive temperature.

$T_1$ is, for example, equal to 5° C., and $T_2$ is, for example, equal to 10° C. In this example, this means that $T_s$ is therefore at least less than −5° C. These values correspond to a known situation of frosting of the exchanger, and can be determined by testing, for example by checking visually for the appearance of frost.

In an advantageous embodiment, the value $T_2$ varies as a function of the external temperature $T_{ext}$. The value $T_2$ decreases as the external temperature $T_{ext}$ decreases.

The method then includes a step of determining the duration frosting of the external exchanger 14. This determination is carried out by incrementing a counter COMP1 while the external exchanger remains in a frosting condition ($T_{ext} < T_1$ and $T_{ext} - T_s > T_2$) in a step S11. The count value of the counter represents the duration of the frosting of the external exchanger.

In a specific embodiment, the incrementing of the counter COMP1 is a function of the external temperature. For example, the counter COMP1 is incremented more rapidly if the external temperature $T_{ext}$ is very low. For example, if $T_{ext} < -10$° C., the counter is incremented by 2 every second, and if $T_{ext} \geq -10$° C., the counter is incremented by 1 every second. The count value of the counter COMP1 then represents not only the duration but also the intensity of the frosting. There will be more frost if the external temperature $T_{ext}$ is close to 0° C.

In a variant, the incrementing of the counter COMP1 is a function of the difference $T_{ext} - T_s$. As this difference increases, the counter is incremented more rapidly. For example, if $T_{ext} - T_s > 15$° C., the counter is incremented by 2 every second, and if $T_{ext} - T_s > 15$° C., the counter is incremented by 1 every second. In this case, the count value of the counter COMP1 also represents the intensity of the frosting.

If the aforesaid conditions for the frosting of the external exchanger are no longer present, the counter is not necessarily reset to zero. For example, if the external temperature $T_{ext}$ remains low but the difference $T_{ext}-T_s$ decreases, the frost remains present on the external exchanger. Thus the counter COMP1 is reset to zero only if the temperature $T_{ext}$ is greater than or equal to a temperature value $T_5$ greater than the temperature $T_1$. $T_5$ is, for example, equal to 8° C. This zero resetting of the counter COMP1 is illustrated by steps S12 and S13. Step S12 is a step of comparing the temperature $T_{ext}$ with the predefined value $T_5$. If $T_{ext} \geq T_5$, the counter COMP1 is reset to zero in step S13. If $T_{ext} < T_5$, the method continues to the next step. Thus the count value of the counter COMP1 can be retained when the vehicle is stopped or put into a sleep state.

Advantageously, the counter COMP1 is also reset to zero if the system is activated in air conditioning mode for a minimum duration. This is because, in this operating mode, the external exchanger operates as a condenser, causing heat to be supplied to the walls of the external exchanger and causing any frost present on the exchanger walls to melt.

The next step S14 is a comparison step. The value of the counter COMP1 is compared with a predetermined count value Ci. The count value Ci corresponds, for example, to a duration $D_1$ if the counter COMP1 is incremented once every second. The duration $D_1$ is, for example, equal to 5 minutes. For the sake of simplicity, COMP1 denotes both the counter COMP1 and its count value.

If COMP1≥Ci, a command is sent to defrost the exchanger in step S15. Otherwise the counting continues.

A command to defrost the external exchanger is therefore sent if the exchanger frosting conditions are present for a duration Di.

The defrosting operation is then performed in step S16. The flow of the refrigerant fluid in this step corresponds to what has been described in relation to FIG. 4. This step will be described below with reference to FIG. 6.

After the exchanger has been defrosted, the counter COMP1 is reset to zero, and there is a return to step S13.

For the detection of frosting of the accumulator 15 and for its defrosting, steps substantially identical to steps S10 to S16, denoted S20 to S26 in FIG. 5, are executed in parallel.

In step S20, the detection of frosting of the accumulator 15 consists in detecting whether the following conditions are present:

$T_{ext} < T_3$, and $T_{ext} - T_S > T_4$, and $RPM_{Comp} \geq Ri$ where $T_3$ is a temperature close to 0° C., $T_4$ is a positive temperature, and $R_1$ is a value of motor speed of the compressor 10. $T_3$ is, for example, equal to 6° C., and $T_4$ is, for example, equal to 10° C. (for the same reasons as those applicable to the value chosen for the detection of the frosting of the external exchanger); thus it is possible that $Ti=T_3$ and $T_2=T_4$. Additionally, Ri is, for example, equal to 500 r.p.m. (revolutions per minute), so that the counter is incremented only during the fluid flow phases when the frosting is most intense.

In an advantageous embodiment, the value $T_4$ varies as a function of the external temperature $T_{ext}$.

The duration frosting of the accumulator 15 is then determined, in step S21. In this step, a counter COMP2 is incremented while the frosting conditions of the accumulator 15 remain present ($T_{ext} < T_3$ and $T_{ext} - T_s > T_4$ and $RPM_{Comp} \geq Ri$).

As in the case of step S11, in a specific embodiment, the incrementing of the counter COMP2 is a function of the external temperature. The counter COMP2 is incremented more or less rapidly according to whether the external temperature is higher or lower.

As in the case of the counter COMP1, the counter COMP2 is reset to zero if the temperature $T_{ext}$ is greater than or equal to the temperature value $T_5$. The method therefore comprises a step S22 of comparing the temperature $T_{ext}$ with the predefined value $T_5$, and, if $T_{ext} \geq T_5$, the counter COMP2 is reset to zero in step S23. If $T_{ext} < T_5$, the method continues to step S24. Thus the count value of the counter COMP2 can be retained when the vehicle is stopped or put into a sleep state. The counter COMP2 is also reset to zero if the system is activated in air conditioning mode for a specific minimum duration.

In step S24, the value of the counter COMP2 is compared with a predetermined count value C2. The count value C2 corresponds, for example, to a duration $D_2$ if the counter COMP2 is incremented once every second. The duration $D_2$ is, for example, equal to 200 minutes. If COMP2>C2, a command is sent to defrost the accumulator in step S25. Otherwise the counting continues.

The defrosting operation is then performed in step S26, and, after step S26, the counter COMP2 is reset to zero and there is a return to step S23.

Figure 6:
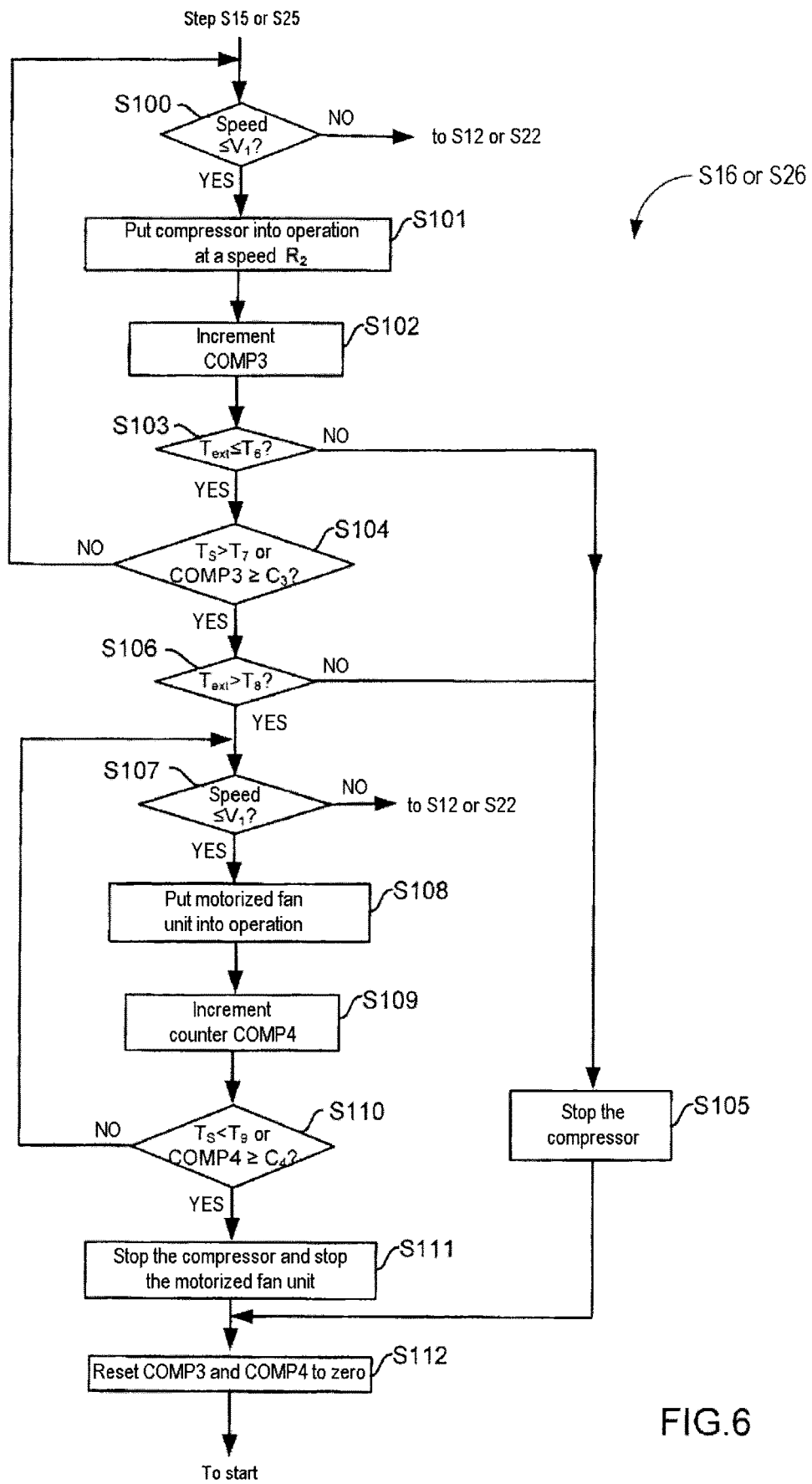
FIG. 6 is a flow diagram showing the sub-steps of the defrosting operation of FIG. 5.

The operation of defrosting the external exchanger and the accumulator (S16 or S26) will now be described with reference to FIG. 6. These two operations differ essentially in the values of the parameters of temperature, counting and motor speed used, since in both cases there is a flow of compressed fluid in the external exchanger and in the accumulator for the execution of defrosting.

The defrosting operation advantageously starts with a step S100 of enabling defrosting. Following the sending of the defrosting command in step S15, the defrosting of the external exchanger and/or the accumulator is enabled only if certain conditions are met. For example, in the example of FIG. 6, defrosting is enabled only if the speed of the vehicle is less than or equal to a predetermined value of speed $V_1$. Advantageously, the speed $V_1$ is equal to 0. In this case, the defrosting operation is enabled only if the vehicle is stationary. Step 5100 is then a step of comparing the vehicle speed with the speed Vi. If the vehicle speed is greater than Vi, the defrosting process is interrupted, and a return is made to step S12 or S22, which is equivalent to waiting for the speed to become less than or equal to $V_1$ in order to start or restart the defrosting operation. If the vehicle speed is already less than or equal to Vi, the operation of defrosting the external exchanger is enabled. It should be noted that, if the defrosting is interrupted, the compressor and, if necessary, the motorized fan unit as described below in the present description are stopped only if there is no other demand to be met. Otherwise they are used, with different motor speeds if necessary, to meet this other demand.

In an improved embodiment, one or more supplementary conditions are added for the enabling of the defrosting operation. For example, at least one of the following conditions is added:

the vehicle must be undergoing the sleep procedure; that is to say, the electronic systems of the vehicle are in the phase of storing their state and stopping their processes; in this case, the sleep procedure is partially interrupted to enable and to start the defrosting operation; the vehicle is kept awake for a specific maximum duration that may be substantially longer than the duration corresponding to the count value $C_3+C_4$ beyond which the defrosting operation is stopped;

there is no other demand for the use of the system circuit, for example for providing comfort in the passenger compartment, for keeping the modules of the vehicle's traction battery at an appropriate temperature to optimize its durability or prevent its degradation due to excessively high or low temperature, or for air conditioning the passenger compartment (heating or cooling the passenger compartment before the user gets in); in a variant, the defrosting operation takes priority over one or more of these demands;

there is no failure in the power supply to the compressor or in the compressor itself;

it must be assumed that the user has left the vehicle; in this case, detection is carried out, for example, to ascertain whether the traction motor has been stopped, or whether the doors have been closed and locked with the key;

the traction motor of the vehicle has been stopped; the defrosting operation can then be enabled even before the vehicle reports that the user is assumed to have left, or reports that it is about to go to sleep;

the vehicle must be connected to an external power supply network; in this case, the power required for the defrosting operation is preferably supplied solely by the external power supply network; or the charge level of the vehicle battery must be above a predefined threshold.

The compressor 10 is then put into operation, in step S101, at a predetermined motor speed $R_2$. The value $R_2$ is a function of the element to be defrosted. The motor speed is advantageously higher for defrosting the accumulator than it is for defrosting the external exchanger.

For the external exchanger, $R_2$ is, for example, equal to 5000 r.p.m., and for the accumulator, $R_2$ is, for example, equal to 6000 r.p.m.

In a specific embodiment, the motor speed $R_2$ of the compressor is defined as a function of the external temperature $T_{ext}$. As the external temperature decreases, the motor speed $R_2$ increases.

In this step, compressed refrigerant fluid flows through the external exchanger and the accumulator so as to cause the melting of the frost on the outer walls of the external exchanger and at least some of the frost on the outer walls of the accumulator.

During the defrosting operation, a counter COMP3 is incremented in a step S102 as long as the following conditions are present:

$T_{ext} \leq T_6$; and $T_s \leq T_7$; and

COMP3 < $C_3$;

where—COMP3 denotes the count value of the counter COMP3;

$T_6$ is a predetermined positive temperature close to 0° C.; if appropriate, it may be a function of the command of the defrosting demand (defrosting of the exchanger or defrosting of the accumulator); $T_6$ is, for example, equal to 5° C. for both defrosting operations if the motor speeds $R_2$ are different;

$T_7$ is another predetermined positive temperature which, if appropriate, may also be a function of the defrosting command; $T_7$ is, for example, equal to 10° C. for both defrosting operations if the motor speeds $R_2$ are different; and $C_3$ is a count value associated with the maximum duration of the defrosting operation. $C_3$ is, for example, a count value corresponding to a duration $D_3$ of 6 minutes.

For this purpose, the method includes a step S103 of comparing the external temperature $T_{ext}$ with the temperature threshold $T_6$ and a step S104 of comparing the temperature $T_s$ with the temperature threshold $T_7$ and of comparing the count value of the counter COMP3 with the count value $C_3$.

If $T_{ext} > T_6$, the defrosting operation is then stopped by stopping the compressor in a step S105. Otherwise, if $T_{ext} \leq T_6$, the method continues to step S104. If $T_s \leq T_7$ and COMP3 < $C_3$, a return is made to step S100. Otherwise, the method continues to step S106, in which the external temperature $T_{ext}$ is compared with a positive temperature $T_8$.

If $T_{ext} > T_8$, the method continues to a second phase of the defrosting operation during which phase the motorized fan unit 17 located near the external exchanger 14 is put into operation to remove by blowing the residual water which is present on the outer walls of the external exchanger as a result of the melting of the frost during the previous phase of the defrosting operation.

This second phase of the defrosting operation is useful only if the external temperature $T_{ext}$ is not highly negative. This is why this second phase is preceded by the step S106 of comparing the external temperature $T_{ext}$ with the temperature $T_8$. $T_8$ is, for example, equal to $-10°$ C. If $T_{ext} \leq T_8$, the motorized fan unit is not put into operation, as any blowing of external air over the external exchanger would cause the refreezing of much of the residual water present on the outer walls of the exchanger. Consequently there is no benefit in executing this second phase. It is even preferable to avoid it, in order to prevent the refrosting of the walls of the exchanger and thus avoid unnecessary power consumption. The compressor is then stopped in step S105. If $T_{ext} > T_8$, the motorized fan unit 17 is put into operation in a step S108.

During this blowing phase, the compressor is preferably put into operation at a speed R3 of less than F¾. R3 is, for example, equal to 4000 r.p.m. for the defrosting of the exchanger and the defrosting of the accumulator. This blowing phase is executed as long as the temperature $T_s$ is greater than or equal to a positive temperature $T_9$ and as long as a maximum duration D4 corresponding to a count value $C_4$ has not been exceeded. This is because, during blowing, the temperature of the fluid flowing through the exchanger falls, and, if this approaches a temperature close to 0° C., there is a risk that the water originating from the melting of the initial frost will freeze. The temperature $T_9$ is, for example, equal to 2° C., and the duration $D_4$ corresponding to $C_4$ is, for example, equal to 2 minutes. $T_9$ is advantageously close to 0° C. This phase therefore includes a step S109 of incrementing a counter COMP4 and a step S110 of comparing the temperature $T_s$ with the value $T_9$ and comparing the count value of the counter COMP4 with the count value $C_4$. Step S108 is advantageously preceded by a step S107 of enabling defrosting, identical to step S100. If the defrosting is not enabled because of a non-zero vehicle speed or a priority demand, for example a demand for thermal comfort, for pre-conditioning of the passenger compartment or for battery air conditioning, a return is made to step S12 or S22. In this case, the compressor and the motorized fan unit are stopped only if there is no other demand to be met. Otherwise they are used, with different motor speeds if necessary, to meet this other demand.

The blowing phase is stopped when the temperature $T_s$ is less than $T_9$ or when the count value of the counter COMP4 is greater than or equal to the count value $C_4$. The compressor and the motorized fan unit are then stopped, in step S111. As long as one or other of these two conditions is not met, the blowing continues and the counter COMP4 is incremented.

The counters COMP3 and COMP4 are reset to zero, in a step S112, only after the compressor, and the motorized fan unit if appropriate, has/have been stopped. A return is then made to step S13 or S23 in which the counters COMP1 and COMP2 are reset to zero.

In a more general embodiment, the compressor, and the motorized fan unit if appropriate, cease(s) to be used for defrosting as soon as a demand for use with higher priority in the system occurs. In a variant, the defrosting demand takes priority over one or more other demands.

After the counters COMP1, COMP2, COMP3 and COMP4 have been reset to zero, a return is made to the start of the process. In this case, and also in the case where defrosting ceases to be enabled, the heat pump is put into the operating mode demanded by the system. If no mode is demanded, the heat pump is put in the rest state.

Clearly, although the invention has been described with reference to a specific embodiment, it is not restricted in any way by this, and comprises all the technical equivalents of the means described and their combinations where these fall within the scope of the invention.

Figure 7:
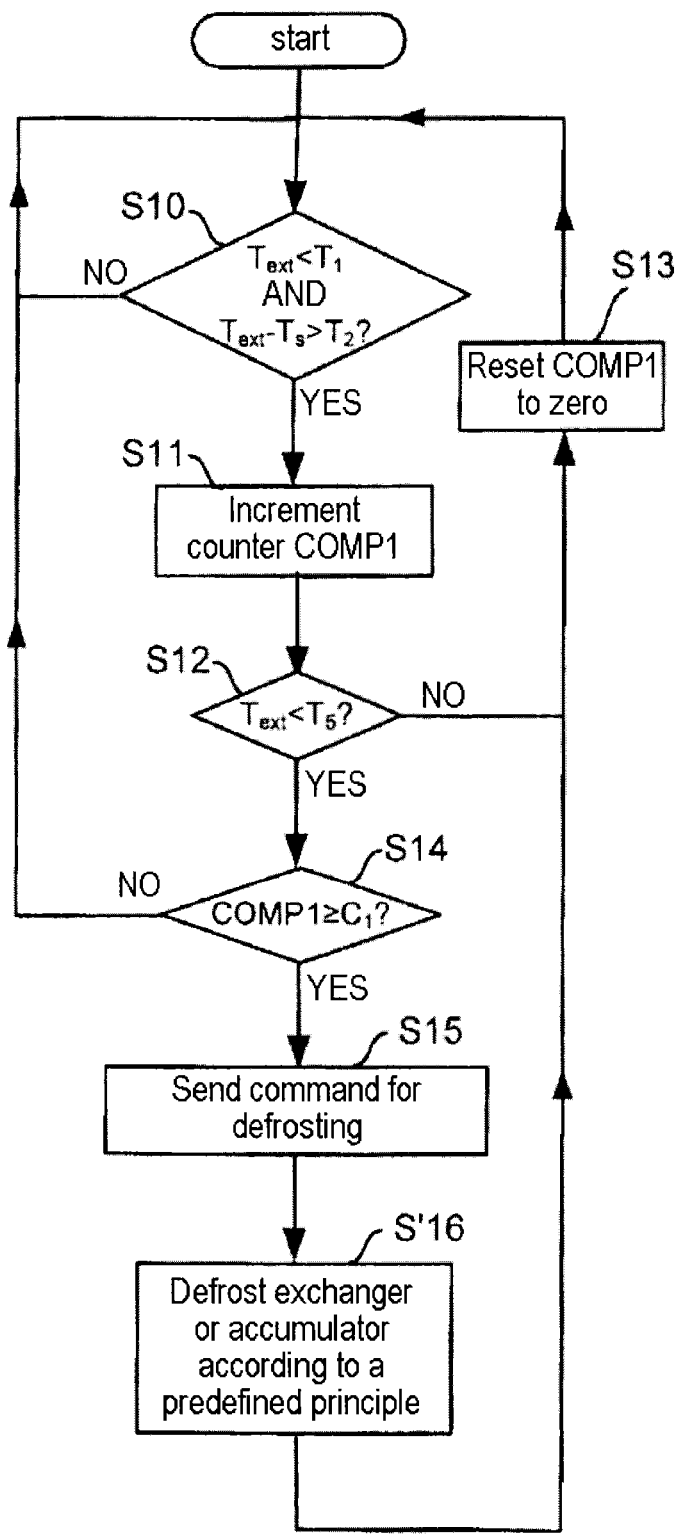
FIG. 7 is a flow diagram showing the main steps of a second embodiment of the method of the invention.

For example, it is possible, on the basis of detection of frosting of the exchanger, to send a general frosting command, and then to start an operation of defrosting the exchanger or to start an operation of defrosting the accumulator according to a predefined principle. This specific embodiment is shown in FIG. 7. The method then includes steps identical to steps S10 to S14 of FIG. 5. The references S10 to S15 are also used again in FIG. 7. For step S15, however, the defrosting command that is sent is considered to be a command which is valid both for starting an operation of defrosting the external exchanger and for starting an operation of defrosting the accumulator. Then, in a step S'16, an operation of defrosting the external exchanger or an operation of defrosting the accumulator is started, according to said predefined principle. For example, an operation of defrosting the accumulator is started on one of every n occasions, where n is an integer greater than or equal to 2, while on the other occasions an operation of defrosting the external exchanger is started.

Figure 8:
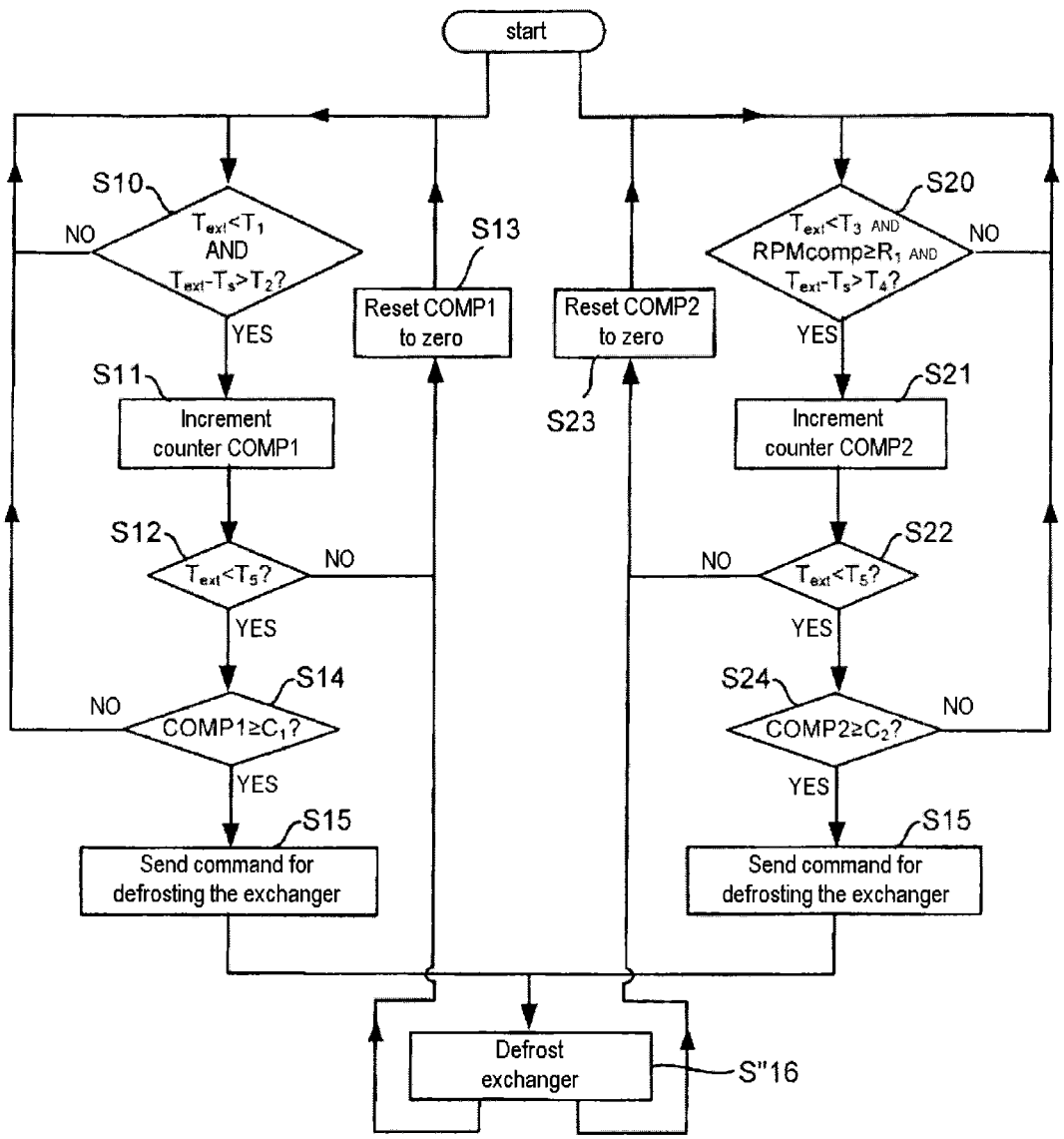
FIG. 8 is a flow diagram showing the main steps of a third embodiment of the method of the invention.

In another variant shown in FIG. 8, the detection of frosting on the exchanger (S10 to S15) and the detection of frosting on the accumulator (S20 to S25) are carried out simultaneously, as described above, while in the defrosting step, denoted S"16, the defrosting parameters of the circuit will be those of the defrosting of the accumulator if its frosting is detected, or otherwise those of the defrosting of the external exchanger.

The invention claimed is:

1. A control method for a heat pump system for a motor vehicle, the system including a compressor for heating and compressing a refrigerant fluid, an internal heat exchanger forming a condenser in a heating mode for heating internal air by exchange with the refrigerant fluid flowing from the compressor, an expansion valve for cooling the refrigerant fluid, an external heat exchanger forming an evaporator in the heating mode for heating the refrigerant liquid flowing from the expansion valve by exchange with external air, and an accumulator interposed between the external heat exchanger and the compressor for storing the refrigerant fluid before compression, the method comprising:
   a) in the heating mode, detecting frosting of the external heat exchanger;
   b) determining a data element representing a duration of the frosting of the heat exchanger;
   c) if the duration of the frosting of the external heat exchanger is greater than or equal to a first predetermined maximum duration, sending a command for defrosting the external heat exchanger; and
   d) if a command for defrosting the external heat exchanger is sent, starting an operation of defrosting the external heat exchanger and, according to a predefined criterion, starting an operation of defrosting the accumulator by circulating a fluid compressed by the compressor in the external heat exchanger and the accumulator,
   wherein, in operation a), frosting of the external heat exchanger is detected if the external air temperature is below a second predetermined temperature value and the temperature difference between the external air temperature and the temperature of the refrigerant fluid at an outlet of the external heat exchanger is above a third predetermined temperature value.

2. The method as claimed in claim 1, wherein an operation of defrosting the accumulator is started on one of every n occasions, where n is an integer greater than or equal to 2, if a command for defrosting the external heat exchanger is sent, and an operation of defrosting the external heat exchanger is started on other occasions.

3. The method as claimed in claim 1, wherein the operation of defrosting the external heat exchanger comprises putting the compressor into operation at a first predetermined motor speed, to cause hot refrigerant fluid to flow in the external heat exchanger and the accumulator for a duration which is less than or equal to a third predetermined maximum duration, the motor speed and the third maximum duration being a function of the defrosting operation.

4. The method as claimed in claim 3, the system further including a motorized fan unit near the external heat exchanger, the operation of defrosting the external exchanger further comprises, if the external air temperature is above a first predetermined temperature value, putting the motorized fan unit into operation for a duration less than or equal to a fourth maximum duration to produce an air flow used to remove water remaining on outer walls of the external heat exchanger after melting of the frost.

5. The method as claimed in claim 1, wherein the third temperature value is a function of the external air temperature.

6. The method as claimed in claim 1, wherein the operation of defrosting the external exchanger is started only if a speed of the vehicle is less than or equal to a predetermined value of speed of 30 km/h or below.

7. A control method for a heat pump system for a motor vehicle, the system including a compressor for heating and compressing a refrigerant fluid, an internal heat exchanger forming a condenser in a heating mode for heating internal air by exchange with the refrigerant fluid flowing from the compressor, an expansion valve for cooling the refrigerant fluid, an external heat exchanger forming an evaporator in the heating mode for heating the refrigerant liquid flowing from the expansion valve by exchange with external air, and an accumulator interposed between the external heat exchanger and the compressor for storing the refrigerant fluid before compression, the method comprising:
a) in the heating mode, detecting frosting of the external heat exchanger;
b) determining a data element representing a duration of the frosting of the heat exchanger;
c) if the duration of the frosting of the external heat exchanger is greater than or equal to a first predetermined maximum duration, sending a command for defrosting the external heat exchanger; and
d) if a command for defrosting the external heat exchanger is sent, starting an operation of defrosting the external heat exchanger and, according to a predefined criterion, starting an operation of defrosting the accumulator by circulating a fluid compressed by the compressor in the external heat exchanger and the accumulator, wherein:
operation a) further comprises detecting the frosting of the accumulator;
operation b) further comprises determining a data element representing the duration of the frosting of the accumulator; and
operation c) further comprises sending a command for defrosting the accumulator if the duration of the frosting of the external heat accumulator is greater than or equal to a second predetermined maximum duration;
wherein an operation of defrosting the accumulator is started if a command for defrosting the accumulator is sent; and
wherein, during operation b), a first counter is incremented when the frosting of the external heat exchanger is detected, and a second counter is incremented when the frosting of the accumulator is detected.

8. The method as claimed in claim 7, wherein, in operation a), the frosting of the accumulator is detected if the motor speed of the compressor is above a second predetermined value of motor speed, an external air temperature is below a fourth predetermined temperature value, and a temperature difference between the external air temperature and a temperature of the refrigerant fluid at an outlet of the external heat exchanger is above a fifth predetermined temperature value.

9. The method as claimed in claim 8, wherein the fifth temperature value is a function of the external air temperature.

10. The method as claimed in claim 7, wherein the first and second counters are reset to zero when the external air temperature is higher than or equal to a sixth predetermined positive temperature value.

11. The method as claimed in claim 7, wherein, during operation c), a command for defrosting the external exchanger is sent if the count value of the first counter is greater than or equal to a first count value representing the first maximum duration, and a command for defrosting the accumulator is sent if the count value of the second counter is greater than or equal to a second count value representing the second maximum duration.

12. The method as claimed in claim 7, wherein an incrementation interval, or an incrementation speed, of at least one of the first counter and the second counter is a function of an external temperature.

13. The method as claimed in claim 7, wherein an incrementation interval, or an incrementation speed, of at least one of the first counter and the second counter is a function of a temperature difference between an external air temperature and a temperature of the refrigerant fluid at an outlet of the external heat exchanger.

14. A control method for a heat pump system for a motor vehicle, the system including a compressor for heating and compressing a refrigerant fluid, an internal heat exchanger forming a condenser in a heating mode for heating internal air by exchange with the refrigerant fluid flowing from the compressor, an expansion valve for cooling the refrigerant fluid, an external heat exchanger forming an evaporator in the heating mode for heating the refrigerant liquid flowing from the expansion valve by exchange with external air, and an accumulator interposed between the external heat exchanger and the compressor for storing the refrigerant fluid before compression, the method comprising:
a) in the heating mode, detecting frosting of the external heat exchanger;
b) determining a data element representing a duration of the frosting of the heat exchanger;
c) if the duration of the frosting of the external heat exchanger is greater than or equal to a first predetermined maximum duration, sending a command for defrosting the external heat exchanger; and
d) if a command for defrosting the external heat exchanger is sent, starting an operation of defrosting the external heat exchanger and, according to a predefined criterion, starting an operation of defrosting the accumulator by circulating a fluid compressed by the compressor in the external heat exchanger and the accumulator,
wherein the operation of defrosting the external heat exchanger comprises putting the compressor into operation at a first predetermined motor speed, to cause hot refrigerant fluid to flow in the external heat exchanger and the accumulator for a duration which is less than or equal to a third predetermined maximum duration, the motor speed and the third maximum duration being a function of the defrosting operation,
wherein the putting the compressor into operation at a first motor speed for a duration which is less than or equal to a third maximum duration comprises:
putting the compressor into operation at the first motor speed;
incrementing a third counter, as long as the temperature of the refrigerant fluid at an outlet of the external heat exchanger is less than or equal to a seventh predetermined temperature value and as long as a count value of the third counter is less than a third predetermined count value representing a fifth maximum duration which is less than the third maximum duration, and as long as an external temperature is less than or equal to an eighth predetermined temperature; and
stopping the compressor when the incrementing of the third counter is stopped.

15. The method as claimed in claim 14, wherein the putting the motorized fan unit into operation for a duration which is less than or equal to a fourth maximum duration comprises:
putting the motorized fan unit into operation and if an external air temperature is greater than or equal to the first predetermined temperature value;
incrementing a fourth counter, as long as a temperature of the fluid at the outlet of the external heat exchanger is greater than or equal to a ninth predetermined temperature value and as long as the count value of the fourth counter is less than a fourth predetermined count value representing said fourth maximum duration; and stopping the motorized fan unit when the incrementing of the fourth counter is stopped.

16. The method as claimed in claim 15, wherein the compressor is put into operation while the motorized fan unit is being put into operation.

17. The method as claimed in claim 16, wherein, during the incrementing of the fourth counter, the compressor operates at a third motor speed which is less than or equal to said first motor speed.

* * * * *